(12) United States Patent
Watanabe (10) Patent No.: US 8,557,409 B2
(45) Date of Patent: Oct. 15, 2013

(54) PERPENDICULAR MAGNETIC RECORDING MEDIUM

(75) Inventor: Sadayuki Watanabe, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 73 days.

(21) Appl. No.: 13/196,045

(22) Filed: Aug. 2, 2011

(65) Prior Publication Data

US 2012/0028077 A1 Feb. 2, 2012

(30) Foreign Application Priority Data

Aug. 2, 2010 (JP) .................. 2010-173411
Mar. 15, 2011 (JP) .................. 2011-056576

(51) Int. Cl.
G11B 5/66 (2006.01)

(52) U.S. Cl.
USPC ..................................... 428/828.1

(58) Field of Classification Search
None
See application file for complete search history.

(56) References Cited

U.S. PATENT DOCUMENTS

2007/0292720 A1* 12/2007 Suess .................. 428/828.1

FOREIGN PATENT DOCUMENTS

| JP | 2000-113442 A | 4/2000 |
| JP | 2003-178412 A | 6/2003 |
| JP | 2008-084481 A | 4/2008 |
| JP | 2008-287853 A | 11/2008 |
| JP | 2010-009683 A | 1/2010 |

OTHER PUBLICATIONS

Oikawa, et al., Microstructure and Magnetic Properties of CoPtCr-SiO2 Perpendicular Recording Media, IEEE Transactions on Magnetics, vol. 38, No. 5, Sep. 2002.

Inaba, et al., Magnetic Properties of Hard/Soft-Stacked Perpendicular Media Having Very Thin Soft Layers with a High Saturation Magnetization, Journal of the Magnetics Society of Japan, vol. 31, No. 3, 2007, pp. 178-183 (English abstract provided).

Partial translation of a Japanese Office Action cited in Japanese counterpart application No. 2011-056576, dated Jun. 18, 2013.

* cited by examiner

*Primary Examiner* — Kevin Bernatz
(74) *Attorney, Agent, or Firm* — Rossi, Kimms & McDowell LLP (57) ABSTRACT

A perpendicular magnetic recording medium is disclosed that enables a high track density while maintaining good OW characteristics, SNR, and thermal stability. The medium includes a magnetic recording layer on a non-magnetic base, wherein the magnetic recording layer includes a first magnetic layer, a first exchange coupling control layer, a second magnetic layer, a third magnetic layer, and a fourth magnetic layer, in that order. It is preferable that when the perpendicular magnetic anisotropy constants of the first magnetic layer, second magnetic layer, third magnetic layer, and fourth magnetic layer are $Ku_1$, $Ku_2$, $Ku_3$, and $Ku_4$ respectively, relationships of $Ku_4 > Ku_3 > Ku_2$ and $Ku_1 > Ku_3 > Ku_2$ are satisfied.

4 Claims, 4 Drawing Sheets

PERPENDICULAR MAGNETIC RECORDING MEDIUM

BACKGROUND OF THE INVENTION

A. Field of the Invention

The present invention relates to a perpendicular magnetic recording medium mounted in various kinds of magnetic recording devices. More particularly, the invention relates to a perpendicular magnetic recording medium mounted in a hard disk drive (HDD) used as an external memory device of a computer, AV instrument, or the like.

B. Description of the Related Art

As a result of a sharp rise in demand for an increased HDD recording density, a magnetic recording method is shifting from a heretofore known longitudinal magnetic recording method to a perpendicular magnetic recording method, which is advantageous in increasing density. A perpendicular magnetic recording medium (hereafter also abbreviated to being called a perpendicular medium) used in a perpendicular magnetic recording is mainly configured of a magnetic recording layer of a hard magnetic material, an underlayer for orienting the recording magnetization of the magnetic recording layer in a perpendicular direction, a protective layer that protects the surface of the magnetic recording layer, and a back layer of a soft magnetic material that fulfills a role of concentrating magnetic flux emitted by a magnetic head used in a recording onto the recording layer.

As a detailed structure of the magnetic recording layer, a structure called a granular structure, wherein ferromagnetic crystal grains are surrounded and magnetically divided by a non-magnetic grain boundary component, is generally used. In the following description, the ferromagnetic crystal grains may be abbreviated to being called ferromagnetic grains. $CoPtCr$—$SiO_2$, or the like, wherein the ferromagnetic grains are formed from Co, Pt, and Cr and the non-magnetic grain boundary component is the oxide $SiO_2$, is proposed as a specific example of the granular structure (for example, refer to JP-A-2003-178412).

A characteristic primarily required of a magnetic recording medium is the size of the recording density, meaning how many signals can be written, and in order to realize a high recording density, a miniaturization of the ferromagnetic grains of the magnetic recording layer, or a reduction of magnetic interaction between the ferromagnetic grains, is effective. However, as a depreciation of thermal stability due to a so-called thermal fluctuation occurs when promoting a miniaturization of the ferromagnetic grains, it is necessary to increase a perpendicular magnetic anisotropy energy Ku held by the ferromagnetic grains. It is reported that, with a perpendicular medium, $CoPtCr$—$SiO_2$, wherein an oxide is added, is superior in the two characteristics of reducing interaction between grains and high Ku in comparison with CoPtCrB, which is a material used in a heretofore known longitudinal medium (for example, refer to T. Oikawa et al., *IEEE Transaction on Magnetics* (*U.S.A.*), 2002, volume 38, number 5, pages 1,976 to 1,978). Because of this, it can be supposed that a hard magnetic material with an oxide or nitride as a non-magnetic grain boundary component is more advantageous in increasing the recording density of a perpendicular medium.

Meanwhile, with regard to the strength of a magnetic field generated by the magnetic head that carries out a recording onto a magnetic recording medium in an HDD, it is known that the necessary magnetic field strength is proportional to Ku. Consequently, when Ku is increased, it is also necessary to increase the strength of the magnetic head magnetic field. However, as there is a limit to magnetic field strength, a problem occurs when increasing Ku in that a saturation recording wherein the magnetization of the magnetic recording layer is all oriented in one desired direction becomes difficult. Also, when promoting a miniaturization of the ferromagnetic grain size, a demagnetizing field acting on the ferromagnetic grains is reduced, and this also leads to an increase in a magnetization switching field. That is, there is a trade-off relationship, in that a miniaturization of the ferromagnetic grains and an increase of Ku with a view to increasing the recording density causes a depreciation in the writing performance of the magnetic recording medium. Because of the heretofore described kind of background, there is a demand for a method whereby the signal quality and stability of a magnetic recording medium are improved, while maintaining the writing performance.

In response to this problem, a method is proposed whereby, by making the magnetic recording layer a multilayer structure of two or more magnetic layers and a layer controlling coupling force inserted between the magnetic layers, and weakening the exchange coupling force between the magnetic layers, the switching field is reduced with barely any depreciation of thermal stability. This kind of medium is called an exchange coupling control medium. Although the exchange coupling force is infinite when directly stacking the two magnetic layers, it is possible to control the exchange coupling force by inserting an exchange coupling control layer between the two magnetic layers. When weakening the exchange coupling force with an exchange coupling control layer, the switching field reaches an extremely small value at a certain optimum exchange coupling force. When the exchange coupling force is further weakened, the result obtained is that the switching field increases again when the exchange coupling force approaches zero (for example, refer to *J. Magn. Soc. Jpn.*, 2007, volume 31, page 178). This occurs because each of the two magnetic layers carries out a differing magnetization switching (that is, an incoherent magnetization switching), while also maintaining a weak exchange coupling. As a developed form of this, there is proposed a structure having a total of three magnetic layers, wherein the magnetic layer above the exchange coupling control layer is divided into two, and wherein Ku gradually increases from the upper portion (for example, refer to JP-A-2008-287853).

In the proposed exchange coupling control medium, a layer with a low Ku is disposed in a portion nearest to the magnetic head. As a result of diligent study by the inventor, it is found that an exchange coupling control medium with this kind of structure is disadvantageous in narrowing the track pitch. It is ideal that the recording field of the magnetic head is such that a strong magnetic field is generated in only a down-track direction. However, in actual practice, a weak recording field is also generated in a cross-track direction. Because of this, the cross-track direction component of the recording field affects an adjacent track into which a signal has already been written, and the strength of the signal written is reduced.

As heretofore described, it is found that there is a limit to the narrowing of the track pitch in an exchange coupling control medium thought to be effective as a perpendicular medium providing a good writing performance, signal quality, and stability.

The present invention is directed to overcoming or at least reducing the effects of one or more of the problems set forth above.

SUMMARY OF THE INVENTION

Bearing in mind the above problem, the inventor, as a result of diligent study, has found that the problem is solved by adopting a specific configuration for the magnetic recording layer, and has completed the invention.

That is, the invention is such that, in a perpendicular magnetic recording medium including a magnetic recording layer on a non-magnetic base, the magnetic recording layer includes a first magnetic layer, an exchange coupling control layer, a second magnetic layer, a third magnetic layer, and a fourth magnetic layer, in that order.

It is preferable that when the perpendicular magnetic anisotropy constants of the first magnetic layer, second magnetic layer, third magnetic layer, and fourth magnetic layer are $Ku_1$, $Ku_2$, $Ku_3$, and $Ku_4$ respectively, relationships of $Ku_4 > Ku_3 > Ku_2$ and $Ku_1 > Ku_3 > Ku_2$ are satisfied.

Furthermore, it is possible to adopt a structure wherein an exchange coupling layer is added to the heretofore described structure. That is, the structure of the magnetic recording layer is a structure wherein the first magnetic layer, a first exchange coupling control layer, the second magnetic layer, a second exchange coupling control layer, the third magnetic layer, and the fourth magnetic layer are sequentially stacked, a structure wherein the first magnetic layer, the first exchange coupling control layer, the second magnetic layer, the third magnetic layer, the second exchange coupling control layer, and the fourth magnetic layer are sequentially stacked, or a structure wherein the first magnetic layer, the first exchange coupling control layer, the second magnetic layer, the second exchange coupling control layer, the third magnetic layer, a third exchange coupling control layer, and the fourth magnetic layer are sequentially stacked.

By configuring the magnetic recording layer as heretofore described, there is realized a perpendicular magnetic recording medium that, while providing good writing performance in the down-track direction, low signal noise performance, and thermal stability, at the same time prevents unnecessary writing into an adjacent track in the cross-track direction, thus enabling a high track density.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Hereafter, a description will be given, referring to the drawings, of an embodiment of the invention.

Figure 1:
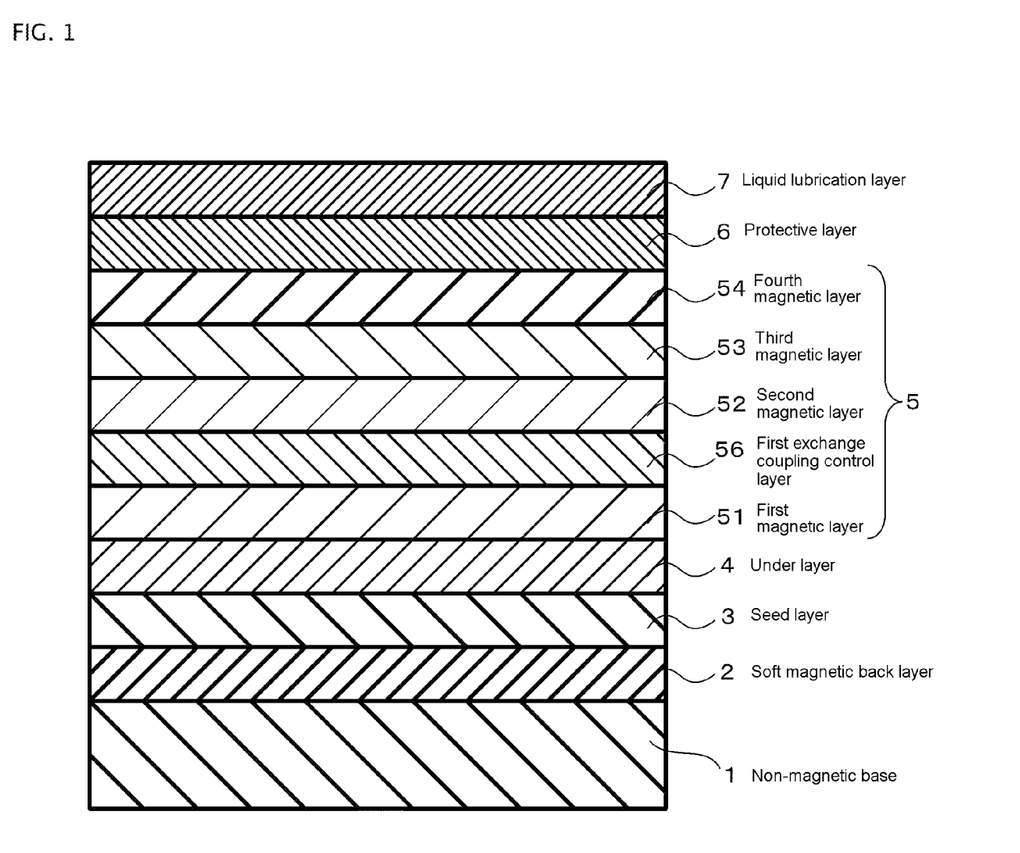
FIG. 1 is a sectional schematic diagram of a perpendicular magnetic recording medium according to the invention.

FIG. 1 is a sectional schematic diagram for illustrating an example of a configuration of a perpendicular magnetic recording medium of the invention. The perpendicular magnetic recording medium is such that soft magnetic back layer 2, seed layer 3, underlayer 4, magnetic recording layer 5, and protective layer 6 are stacked sequentially on non-magnetic base 1, and furthermore, liquid lubrication layer 7 is formed on protective layer 6. Magnetic recording layer 5 has first magnetic layer 51, exchange coupling control layer 56, second magnetic layer 52, third magnetic layer 53, and fourth magnetic layer 54, in that order, as shown in FIG. 1.

In a still more preferable configuration, the Ku of fourth magnetic layer 54, which is the outermost portion of magnetic recording layer 5 and is disposed in the position nearest to a magnetic head, is increased, and the Ku of the layers below is gradually reduced in the order of third magnetic layer 53 and second magnetic layer 52. Furthermore, the Ku is increased again for first magnetic layer 51 disposed as the lowest layer across the coupling layer. By configuring magnetic recording layer 5 in this way, it is possible to prevent an unintentional writing into tracks adjacent on either side to a track into which a recording is actually being carried out.

The effect of this is described as follows. By disposing fourth magnetic layer 54 with the high Ku in the outermost portion of magnetic recording layer 5, it is possible to increase resistance to writing into adjacent tracks caused by a comparatively weak magnetic field generated by the magnetic head in a cross-track direction. Furthermore, as a recording field generated by the magnetic head decreases as it moves away from the magnetic head, the comparatively weak magnetic field in the cross-track direction does not affect the lower layers, third magnetic layer 53, second magnetic layer 52, and the like, of magnetic recording layer 5. Because of the heretofore described advantages, it is possible to prevent a magnetization switching of the whole magnetic recording layer.

Meanwhile, the magnetic head generates a strong recording field in a down-track direction, and the recording field has an effect as far as a comparatively deep position in magnetic recording layer 5. The recording field, firstly, prompts a magnetization switching of second magnetic layer 52, which has the lowest Ku, and the magnetization switching of second magnetic layer 52 induces a magnetization switching of third magnetic layer 53 and fourth magnetic layer 54. Furthermore, by first magnetic layer 51 switching as though dragged along by the magnetization switching of second magnetic layer 52, third magnetic layer 53, and fourth magnetic layer 54, the magnetization of the whole of the magnetic recording layer switches. Because of this advantage, it is possible to secure sufficient recording performance in the down-track direction.

In this way, a perpendicular magnetic recording medium including good writing performance, high signal quality, and high thermal stability, and realizing high track density, is realized.

In the perpendicular magnetic recording medium of the invention, it is possible to use an Al alloy coated with an NiP plating, chemically strengthened glass, crystallized glass, or the like, used for a normal magnetic recording medium as the material of non-magnetic base 1 (which may also be called a non-magnetic substrate). When the heating temperature of the base is kept within 10° C., it is also possible to use a plastic base formed from a resin such as polycarbonate or polyolefin. Apart from this, it is also possible to use a Si base.

Soft magnetic back layer 2 is a layer whose formation is preferable in order to improve recording and reproduction characteristics by controlling a magnetic flux from the magnetic head used in a magnetic recording. It is also possible to omit soft magnetic back layer 2. As soft magnetic back layer 2, it is possible to use a crystalline NiFe alloy, sendust (FeSiAl) alloy, CoFe alloy, or the like, a microcrystalline FeTaC, CoFeNi, CoNiP, or the like, or a non-crystalline CoFeTaZr, or the like, including a total of 8% or more of Ta, Zr, Nb, B, or the like, which are non-magnetic compounds. In order to improve the recording performance, it is preferable that the saturation magnetization of soft magnetic back layer 2 is on the large side. Also, although an optimum value of the thickness of soft magnetic back layer 2 changes in accordance with the structure and characteristics of the magnetic head used in the magnetic recording, in a case in which soft magnetic back layer 2 is formed by a continuous deposition with other layers, and the like, it is desirable in terms of a balance with productivity that the thickness is 10 nm or more, 500 nm or less.

Seed layer 3 is a layer whose formation immediately below the underlayer is preferable in order to improve the orientation of underlayer 4, or to miniaturize grain size, but it is also possible to omit seed layer 3. It is possible to use a non-magnetic material or a soft magnetic material for seed layer 3. For the sake of recording capability, it is desirable that the distance between the magnetic head and soft magnetic layer is small. Consequently, a soft magnetic material is more preferably used so that seed layer 3 functions in the same way as the soft magnetic back layer, and when using a non-magnetic material, it is desirable that it is as thin as possible. As a material of seed layer 3 exhibiting soft magnetic characteristics, it is possible to use a Ni based alloy such as NiFe, NiFeNb, NiFeSi, NiFeB, or NiFeCr. Also, it is possible to use pure Co, a Co based alloy such as CoB, CoSi, CoNi, or CoFe, or CoNiFe, CoNiFeSi, or the like. An hcp or fcc structure is preferable as the crystal structure. When including Fe, the structure is liable to become a bcc structure when the amount of Fe included is large, meaning that it is preferable that the amount of Fe included is 20% or less. Other than a Ni based alloy such as NiP or Co based alloy such as CoCr, it is also possible to use Pt, Ta, Ti, or the like, as a material of the seed layer 3 exhibiting non-magnetism.

Underlayer 4 is a layer whose formation immediately below magnetic recording layer 5 is preferable in order to optimally control the crystal orientation, crystal grain size, grain size distribution, and grain boundary segregation of magnetic recording layer 5. It is possible to change the crystal structure as appropriate in accordance with magnetic recording layer 5. When an hcp or fcc structure is adopted for magnetic recording layer 5, it is preferable to adopt an hcp or fcc crystal structure for underlayer 4 too. Ru, Rh, Os, Ir, Pt, or the like, is optimally used as the material of underlayer 4. Also, an alloy that has Ru, Rh, Os, Ir, or Pt as a main component is preferably used. Also, in order to block a magnetic interaction between magnetic recording layer 5 and soft magnetic back layer 2, it is preferable that underlayer 4 is non-magnetic. When a soft magnetic material is used for seed layer 3, it is necessary to take into account a magnetic interaction, including also seed layer 3. With a view to reducing a magnetic spacing between the magnetic head and soft magnetic back layer 2, the smaller the thickness of underlayer 4 the better, with a thickness of 3 to 30 nm being preferably used.

Magnetic recording layer 5 has a configuration wherein at least first magnetic layer 51, exchange coupling control layer 56, second magnetic layer 52, third magnetic layer 53, and fourth magnetic layer 54 are stacked sequentially. When the Ku value of each magnetic layer is taken to be $Ku_1$ for first magnetic layer 51, $Ku_2$ for second magnetic layer 52, $Ku_3$ for third magnetic layer 53, and $Ku_4$ for fourth magnetic layer 54, it is preferable that the relationships $Ku_4 > Ku_3 > Ku_2$ and $Ku_1 > Ku_3 > Ku_2$ are satisfied.

First magnetic layer 51 is a layer whose principal role is to take responsibility for the thermal stability of the whole of the magnetic recording layer 5. $1 \times 10^6$ erg/cm$^3$ or more is preferably used as the Ku value. As a material exhibiting this kind of performance, and whose magnetization easy axis is perpendicular to the base surface, it is preferable to use a granular structure, which is a structure wherein ferromagnetic grains are divided by non-magnetic grain boundary components of an oxide. For example, a material wherein an oxide is added to a ferromagnetic material including at least CoPt, such as CoPtCr—SiO$_2$ or CoPt—SiO$_2$, is preferably used. Apart from the SiO$_2$ mentioned above, a Cr oxide (for example, Cr$_2$O$_3$), a Ti oxide (for example, TiO$_2$), a Ta oxide (for example, Ta$_2$O$_5$), a Cu oxide (for example, CuO), a Co oxide (for example, CoO), or the like, are included as examples of the added oxide. While it is possible to add just one kind of these oxides, it is also possible to add a plurality of kinds. It is possible to select as appropriate, so as to obtain an optimum ferromagnetic grain divided structure and crystal orientation. As the crystal structure, it is possible to adopt a crystal structure based on a hexagonal close-packed crystal structure (hcp structure). Because of the relationship with the magnetic spacing, it is preferable that the thickness is as small as possible within a range in which it is possible to ensure the necessary Ku, and it is possible to make it 20 nm or less, or preferably still, 5 to 10 nm. Not only a single layer, but also a multilayer stacked configuration may be adopted for first magnetic layer 51, and when a multilayer configuration is adopted, it is preferable that the total thickness is within the above-mentioned range.

A non-magnetic or weak magnetic material is used for exchange coupling control layer 56. As a non-magnetic material, it is possible to use an alloy having, for example, Ru or Pt as a main component. As a weak magnetic material, it is possible to use an alloy wherein the amount of magnetism is controlled by adding a non-magnetic element such as Cr, Ta, Ru, Mo, or W to at least Co, Fe, or Ni as a magnetic element. CoCr, CoCrTa, CoRuCr, CoCrW, CoW, CoNiCr, CoNiFeCr, and the like, are included as examples. Herein, 100 emu/cc or less is preferable as the saturation amount of magnetism, and it is preferable that the ratio between the magnetic element and non-magnetic element is chosen so that that kind of value is obtained. With the materials given as examples of the weak magnetic material too, even when the amount of the non-magnetic element is set high, and the saturation magnetization reaches zero, it is possible to apply the materials as the exchange coupling control layer by handling in the same way as the previously described non-magnetic materials. For example, with CoCr, the property is non-magnetic in the case of Co42Cr and weakly magnetic in the case of Co33Cr, but it is possible to apply either. It is possible to add an oxide to exchange coupling control layer 56 as a grain boundary component. For example, to give an example with SiO$_2$ as the oxide, the material is Ru—SiO$_2$, Pt—SiO$_2$, CoCr—SiO$_2$, or the like, wherein the previously described non-magnetic or weak magnetic alloy is the crystal component, and the oxide is the grain boundary component. By adding an oxide, it is possible to encourage continuous grain growth from first magnetic layer 51 below. The strength of the exchange coupling force between first magnetic layer 51 and second magnetic layer 52 above and below can be controlled by changing the thickness and amount of magnetization of exchange coupling control layer 56.

Figure 2:
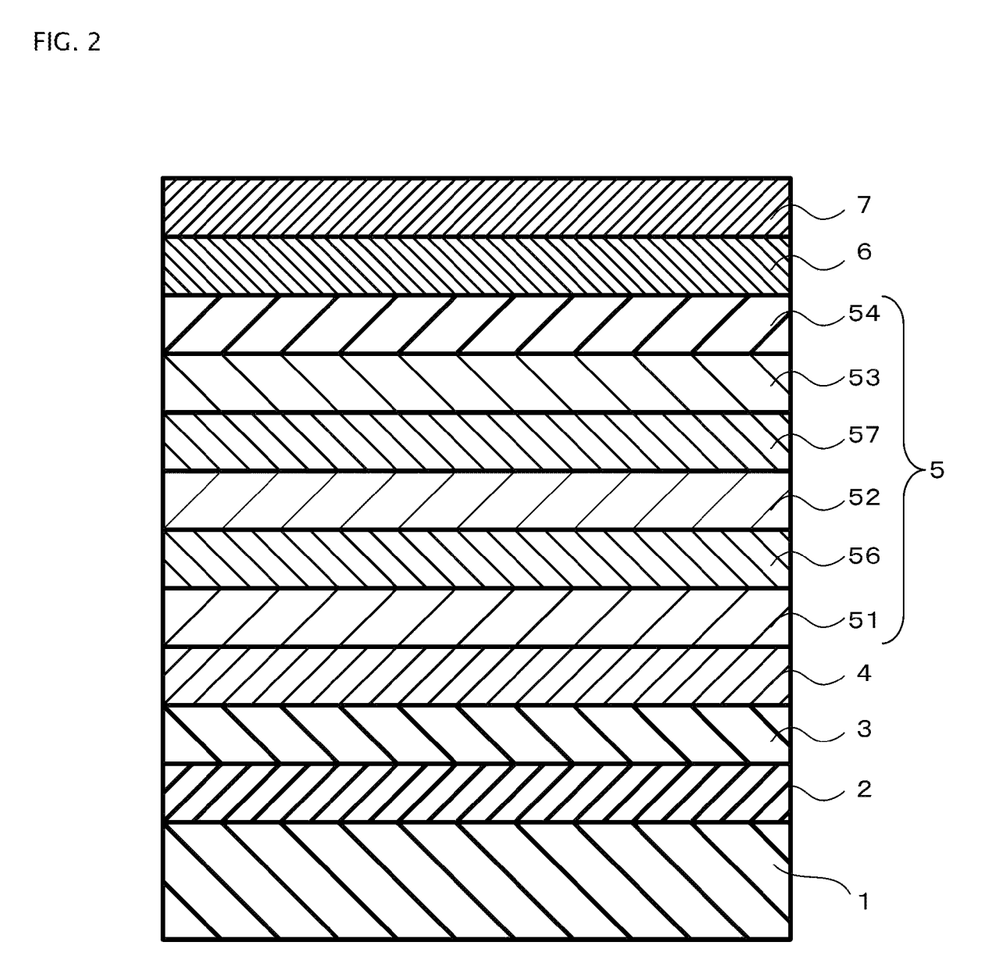
FIG. 2 is a sectional schematic diagram of a perpendicular magnetic recording medium according to the invention.
Figure 3:
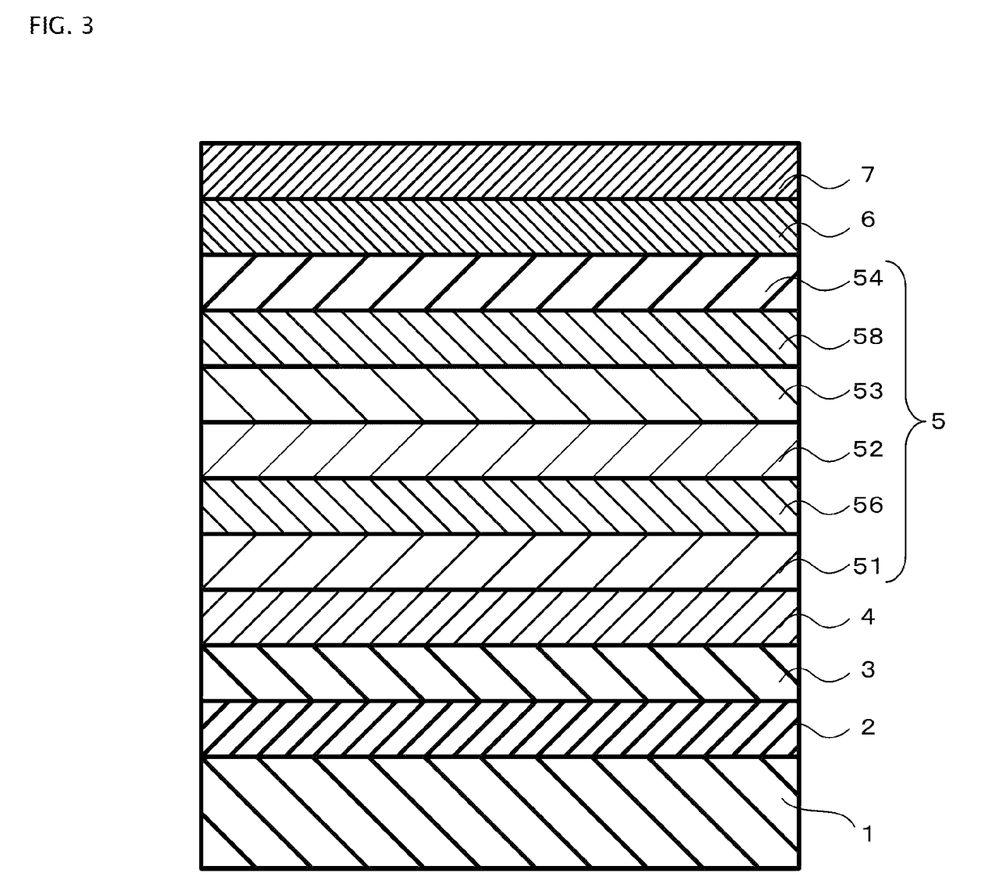
FIG. 3 is a sectional schematic diagram of a perpendicular magnetic recording medium according to the invention.
Figure 4:
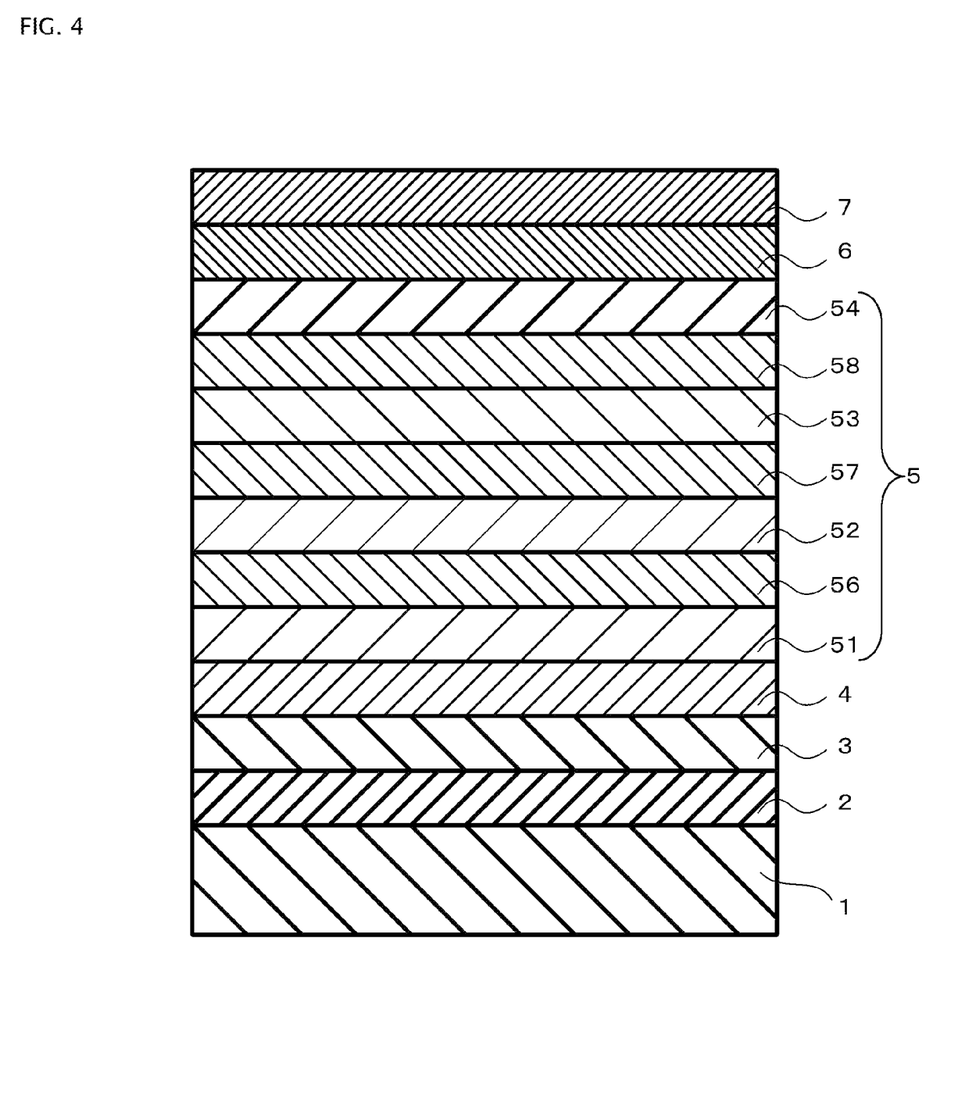
FIG. 4 is a sectional schematic diagram of a perpendicular magnetic recording medium according to the invention.

In FIG. 1, a case is shown in which there is only one exchange coupling control layer, but it is possible to apply a plurality of exchange coupling control layers. FIG. 2 is a sectional schematic diagram of the perpendicular magnetic recording medium according to the invention, wherein a point differing from FIG. 1 is that exchange coupling control layer 57 is further provided between second magnetic layer 52 and third magnetic layer 53. FIG. 3 is a sectional schematic diagram of the perpendicular magnetic recording medium according to the invention, wherein a point differing from FIG. 1 is that exchange coupling control layer 58 is further provided between third magnetic layer 53 and fourth magnetic layer 54. FIG. 4 is a sectional schematic diagram of the perpendicular magnetic recording medium according to the invention, wherein a point differing from FIG. 1 is that exchange coupling control layer 57 is further provided between second magnetic layer 52 and third magnetic layer 53, and the exchange coupling control layer 58 is further provided between the third magnetic layer 53 and fourth magnetic layer 54.

As second magnetic layer 52 principally fulfills a role of reducing a magnetization switching field, it has the smallest Ku among the magnetic layers configuring magnetic recording layer 5. As a material used, it is possible to use the same kinds of material as for first magnetic layer 51, for example, it is possible to use CoPtCr—$SiO_2$, or the like. The composition is selected as appropriate in order to control the Ku within an appropriate range. For example, it is possible to use a material wherein a comparatively large amount of Cr is added. Also, as second magnetic layer 52 is a layer that needs the Ku to be of a comparatively small value, it is possible to use a material that includes a small amount of Pt, and it is also possible to use CoCr—$SiO_2$, or the like, which includes absolutely no Pt.

Third magnetic layer 53 has a Ku between those of second magnetic layer 52 and fourth magnetic layer 54, and fulfills a role of smoothly transmitting a magnetization switching started in second magnetic layer 52 to fourth magnetic layer 54. As a material used, it is possible to use the same kinds of material as for first magnetic layer 51, for example, it is possible to use CoPtCr—$SiO_2$, or the like. By using an amount of added Cr or Pt between those of second magnetic layer 52 and fourth magnetic layer 54, it is possible to appropriately control the Ku. Also, it is also possible to use a material to which no oxide such as $SiO_2$ is added.

Fourth magnetic layer 54, in the same way as first magnetic layer 51, has a high Ku. It fulfills a role of ensuring resistance to the cross-track direction magnetic field on the recording layer surface. As a material used, it is possible to use the same kinds of material as for first magnetic layer 51, for example, it is possible to use CoPtCr—$SiO_2$, or the like. It is also possible to use a material to which no oxide such as $SiO_2$ is added.

An example has been given wherein a material based on CoPtCr is used for the magnetic layers 51, 52, 53, and 54, but for the purpose of grain size control and improvement of crystal orientation, it is also possible to use a material wherein an additional element such as B, Ta, W, Mo, Ru, or Ge is added.

Protective layer 6 can be formed using a heretofore used protective layer material, for example, it can be formed using a protective layer material based on carbon. Rather than a single layer, protective layer 6 can also be of a stacked configuration of, for example, two carbon layers of differing properties, a metal film and a carbon film, or an oxide film and carbon.

Liquid lubrication layer 7 can also be formed using a heretofore used lubricating material, for example, it can be formed using a perfluoropolyether series lubricating material.

Hereafter, a description will be given of working examples of the perpendicular magnetic recording medium of the invention. These working examples are no more than representative examples for optimally describing the magnetic recording medium of the invention, and are in no way limiting.

Working Example 1

A disc-like glass base with a smooth surface is used as non-magnetic base 1 and, after being cleaned, is fed into a sputtering device where each layer is deposited. Firstly, soft magnetic back layer 2 is formed in a three-layer stacked configuration. Firstly, a CoFeTaZr layer is formed to 15 nm under an Ar gas pressure of 3 mTorr using a Co54Fe9Ta6Zr target. Herein, the large numerals in the composition name represent the amount of the immediately following element included. For example, in the case of Co54Fe9Ta6Zr, the numerals indicate that 54% by atomic weight of Fe, 9% by atomic weight of Ta, and 6% by atomic weight of Zr, is included, and that the remainder is Co. The same applies hereafter. Continuing, an Ru layer is formed to 1.2 nm under an Ar gas pressure of 3 mTorr using an Ru target, and continuing, by forming a CoFeTaZr layer to 15 nm under an Ar gas pressure of 3 mTorr using a Co54Fe9Ta6Zr target, a CoFeTaZr/Ru/CoFeTaZr soft magnetic back layer 2 is formed. Continuing, NiCrSi seed layer 3 is deposited to a thickness of 5 nm under an Ar gas pressure of 10 mTorr using a Ni20Cr2Si target. Furthermore, Ru underlayer 4 is deposited to a thickness of 20 nm under an Ar gas pressure of 50 mTorr using a Ru target.

Continuing, a CoPtCr—$SiO_2$ first magnetic layer 51 is formed to a thickness of 5 nm under an Ar gas pressure of 50 mTorr, using a 93 mole % of Co22Pt3Cr to 7 mole % of $SiO_2$ target. Next, a Ru exchange coupling control layer 56 is formed to a thickness of 0.10 nm under an Ar gas pressure of 10 mTorr, using a Ru target. Next, a CoCrPt—$SiO_2$ second magnetic layer 52 is formed to a thickness of 6 nm, using a 95 mole % of Co22Cr10Pt to 5 mole % of $SiO_2$ target. Next, a CoCrPt third magnetic layer 53 is formed to a thickness of 2 nm, using a Co19Cr16Pt target. Next, a CoPtCr fourth magnetic layer 54 is formed to a thickness of 1.5 nm, using a Co20Pt10Cr target. Of the layer depositions thus far, those including $SiO_2$ in the target material are carried out using a pulsed DC magnetron sputtering method, while all others are carried out using a DC magnetron sputtering method. Next, after protective layer 6 formed from carbon is deposited to 2.5 nm using a CVD method, the item is removed from the vacuum device. Subsequently, liquid lubrication layer 7 formed from perfluoropolyether is formed to 1 nm using a dipping method, forming a magnetic recording medium.

Comparison Example 1

The perpendicular magnetic recording medium is fabricated with everything done in the same way as in Working Example 1, except for changing the magnetic recording layer 5 deposition step in the following way.

Continuing from the deposition of the underlayer 4, a CoPtCr—$SiO_2$ first magnetic layer 51 is formed to a thickness of 5 nm under an Ar gas pressure of 50 mTorr, using a 93 mole % of Co22Pt3Cr to 7 mole % of $SiO_2$ target. Next, a Ru exchange coupling control layer 56 is formed to a thickness of 0.10 nm under an Ar gas pressure of 10 mTorr, using a Ru target. Next, a CoCrPt—$SiO_2$ second magnetic layer 52 is formed to a thickness of 7.2 nm, using a 95 mole % of Co22Cr10Pt to 5 mole % of $SiO_2$ target. Next, a CoCrPt third magnetic layer 53 is formed to a thickness of 2.3 nm, using a Co20Pt10Cr target, thus forming magnetic recording layer 5.

That is, magnetic recording layer 5 in Comparison Example 1 is of a configuration where there are three magnetic layers, not including the exchange coupling control layer.

Comparison Example 2

The perpendicular magnetic recording medium is fabricated with everything done in the same way as in Working Example 1, except for changing the magnetic recording layer 5 deposition step in the following way.

Continuing from the deposition of the underlayer 4, a CoPtCr—SiO$_2$ first magnetic layer 51 is formed to a thickness of 5 nm under an Ar gas pressure of 50 mTorr, using a 93 mole % of Co22Pt3Cr to 7 mole % of SiO$_2$ target. Next, an Ru exchange coupling control layer 56 is formed to a thickness of 0.10 nm under an Ar gas pressure of 10 mTorr, using an Ru target. Next, a CoCrPt—SiO$_2$ second magnetic layer 52 is formed to a thickness of 5.7 nm, using a 95 mole % of Co22Cr10Pt to 5 mole % of SiO$_2$ target. Next, a CoCrPt third magnetic layer 53 is formed to a thickness of 3.8 nm, using a Co19Cr16Pt target, thus forming magnetic recording layer 5.

That is, the magnetic recording layer 5 in Comparison Example 2 is of a configuration where there are three magnetic layers, not including the exchange coupling control layer.

Comparison Example 3

The perpendicular magnetic recording medium is fabricated with everything done in the same way as in Working Example 1, except for changing the magnetic recording layer 5 deposition step in the following way.

Continuing from the deposition of the underlayer 4, a CoPtCr—SiO$_2$ first magnetic layer 51 is formed to a thickness of 5 nm under an Ar gas pressure of 50 mTorr, using a 93 mole % of Co22Pt3Cr to 7 mole % of SiO$_2$ target. Next, an Ru exchange coupling control layer 56 is formed to a thickness of 0.10 nm under an Ar gas pressure of 10 mTorr, using an Ru target. Next, a CoCrPt—SiO$_2$ second magnetic layer 52 is formed to a thickness of 4.9 nm, using a 95 mole % of Co17Cr16Pt to 5 mole % of SiO$_2$ target. Next, a CoCrPt third magnetic layer 53 is formed to a thickness of 4.6 nm, using a Co22Cr5Pt target, thus forming magnetic recording layer 5.

That is, the magnetic recording layer 5 in Comparison Example 3 is of a configuration where there are three magnetic layers, not including the exchange coupling control layer.

Comparison Example 4

The perpendicular magnetic recording medium is fabricated with everything done in the same way as in Working Example 1, except that the Ru exchange coupling control layer 56 is not deposited.

Hereafter, a description will be given of performance evaluation results of the perpendicular medium of this working example.

Firstly, as a preliminary study, magnetic anisotropy in a single 10 nm film is measured with a torque meter for every magnetic layer used in the working example and each comparison example. The results thereof are that the 93 mole % of Co22Pt3Cr to 7 mole % of SiO$_2$ has a Ku of $8.2 \times 10^6$ erg/cc, the 95 mole % of Co22Cr10Pt to 5 mole % of SiO$_2$ has a Ku of $2.0 \times 10^6$ erg/cc, the Co19Cr16Pt has a Ku of $4.2 \times 10^6$ erg/cc, the Co20Pt10Cr has a Ku of $8.0 \times 10^6$ erg/cc, the 95 mole % of Co17Cr16Pt to 5 mole % of SiO$_2$ has a Ku of $4.2 \times 10^6$ erg/cc, and the Co22Cr5Pt has a Ku of $2.0 \times 10^6$ erg/cc.

Next, a measurement of the electromagnetic conversion characteristics of Working Example 1 and Comparison Examples 1 to 4 is carried out in order to clarify the practical performance of the invention. An electromagnetic conversion characteristic evaluation is carried out with a spin-stand tester. The recording track width of the magnetic head used is 100 nm, and the reproduction track width is 80 nm.

Table 1 shows a summary of the Ku and electromagnetic conversion characteristic evaluation results of each magnetic layer. A signal-to-noise ratio (SNR), overwrite (OW) characteristics, and oblique magnetic field resistance are shown as electromagnetic conversion characteristic items. SNR is a value measured at a linear recording density of 600 kFCI, and is an index of signal quality, that is, of recording density. OW is a value when a 70 kFCI signal is written over a 500 kFCI linear recording density signal, and is an index of ease of writing onto a medium. The evaluation of oblique magnetic field resistance is carried out as follows. A recording and reproduction is carried out using an evaluation track that carries out an evaluation of oblique magnetic field resistance, and a reproduction signal output thereof is taken to be S1. Next, after carrying out 50 writings into each of tracks adjacent on either side to the evaluation track, the reproduction of the evaluation track is carried out again, and a signal output at this time is taken to be S2. From the results obtained by this evaluation, the oblique magnetic field resistance is defined as S2/S1. The higher this value, the higher the resistance of the head to an oblique magnetic field, and the more it is possible to narrow the track pitch. That is, this means that the track density is increased.

TABLE 1

Electromagnetic Conversion Characteristic Evaluation Results

| | First Magnetic Layer Ku$_1$ (erg/cc) | First Exchange Coupling Control Layer Thickness (nm) | Second Magnetic Layer Ku$_2$ (erg/cc) | Third Magnetic Layer Ku$_3$ (erg/cc) | Fourth Magnetic Layer Ku$_4$ (erg/cc) | OW (db) | SNR (db) | Oblique Magnetic Field Resistance |
|---|---|---|---|---|---|---|---|---|
| Working Example 1 | $8.2 \times 10^6$ | 0.1 | $2.0 \times 10^6$ | $4.2 \times 10^6$ | $8.0 \times 10^6$ | 34.4 | 12.0 | 0.84 |
| Comparison Example 1 | $8.2 \times 10^6$ | 0.1 | $2.0 \times 10^6$ | $8.0 \times 10^6$ | — | 34.4 | 11.9 | 0.79 |
| Comparison Example 2 | $8.2 \times 10^6$ | 0.1 | $2.0 \times 10^6$ | $4.2 \times 10^6$ | — | 34.6 | 11.4 | 0.74 |
| Comparison Example 3 | $8.2 \times 10^6$ | 0.1 | $4.2 \times 10^6$ | $2.0 \times 10^6$ | — | 34.8 | 11.7 | 0.70 |
| Comparison Example 4 | $8.2 \times 10^6$ | — | $2.0 \times 10^6$ | $4.2 \times 10^6$ | $8.0 \times 10^6$ | 17.5 | 5.2 | 0.84 |

On referring to Table 1, it can be seen that the OW characteristics of Working Example 1 and Comparison Examples 1 to 3 are approximately the same, and that there is a difference in SNR and oblique magnetic field resistance. On comparing the oblique magnetic field resistances in detail, a correlation can be seen between the Ku values of the magnetic layers disposed in the outermost portion of magnetic recording layer 5, that is, third magnetic layer 53 or fourth magnetic layer 54, and the size of the oblique magnetic field resistance. It can be seen that the higher the Ku of the outermost portion magnetic layers, the higher the oblique magnetic field resistance. When comparing Comparison Example 1, which has the highest oblique magnetic field resistance among Comparison Examples 1 to 3, and Working Example 1, it can be seen that, while there is no great difference in SNR, Working Example 1 has a superior oblique magnetic field resistance, with a difference of 0.05. It is found that, by configuring the Ku of first magnetic layer 51 to fourth magnetic layer 54 as in the invention, it is possible to realize a superior SNR and oblique magnetic field resistance. Also, when comparing Working Example 1 and Comparison Example 4, it can be seen that in Comparison Example 4, in which no exchange coupling control layer 56 is formed, the OW characteristics decrease significantly, and the SNR also decreases significantly, due to a significant depreciation in writing capability. It is found that, by adopting a configuration where exchange coupling control layer 56 is provided between first magnetic layer 51 and second magnetic layer 52, it is possible to realize a superior SNR and OW characteristics.

Working Example 2

This working example corresponds to the configuration of FIG. 1, in the same way as Working Example 1. The main points differing from Working Example 1 are that magnetic layer 51 further includes $TiO_2$, and that magnetic layer 52 does not include Pt.

A disc-like glass substrate with a smooth surface is used as non-magnetic base 1 and is fed into a sputtering device after being cleaned, FeCoTa is formed to 12 nm under an Ar gas pressure of 3 mTorr using an Fe25Co15Ta target, continuing, Ru is formed to 1.2 nm under an Ar gas pressure of 3 mTorr using an Ru target, and continuing, by forming FeCoTa to 12 nm under an Ar gas pressure of 3 mTorr using an Fe25Co15Ta target, an FeCoTa/Ru/FeCoTa soft magnetic back layer 2 is formed. Continuing, an NiCrFeSi seed layer is deposited to a thickness of 4.5 nm under an Ar gas pressure of 10 mTorr using an Ni20Cr5Fe2Si target. Furthermore, an Ru underlayer is deposited to a thickness of 13 nm under an Ar gas pressure of 50 mTorr using an Ru target.

Continuing, a CoPtCr—$TiO_2$—$SiO_2$ magnetic layer 51 is formed to a thickness of 5.5 nm under an Ar gas pressure of 50 mTorr, using an 89 mole % of Co24Pt2Cr to 8 mole % of $TiO_2$ to 3 mole % of $SiO_2$ target. Next, an Ru exchange coupling control layer 56 is formed to a thickness of 0.12 nm under an Ar gas pressure of 10 mTorr, using an Ru target. Next, a CoCr—$SiO_2$ magnetic layer 52 is formed to a thickness of 1.5 nm, using a 94 mole % of Co17Cr to 6 mole % of $SiO_2$ target. Next, a CoCrPt—$SiO_2$—$Cr_2O_3$ magnetic layer 53 is formed to a thickness of 4.5 nm, using a 91 mole % of Co16Cr17Pt to 7 mole % of $SiO_2$ to 2 mole % of $Cr_2O_3$ target. Next, a CoPtCrB magnetic layer 54 is formed to a thickness of 2.5 nm, using a Co22Pt5Cr5B target. Of the layer depositions thus far, those including an oxide in the target material are carried out using a pulsed DC magnetron sputtering method, while all others are carried out using a DC magnetron sputtering method. Next, after protective layer 6 formed from carbon is deposited to 2.2 nm using a CVD method, the item is removed from the vacuum device. Subsequently, liquid lubrication layer 7 formed from perfluoropolyether is formed to 1 nm using a dipping method, forming a magnetic recording medium.

Working Example 3

The perpendicular magnetic recording medium is fabricated with everything done in the same way as in Working Example 2, except for forming the magnetic recording layer 5 in the following way. This working example corresponds to FIG. 2.

A CoPtCr—$TiO_2$—$SiO_2$ magnetic layer 51 is formed to a thickness of 6.0 nm under an Ar gas pressure of 50 mTorr, using an 89 mole % of Co24Pt2Cr to 8 mole % of $TiO_2$ to 3 mole % of $SiO_2$ target. Next, an Ru exchange coupling control layer 56 is formed to a thickness of 0.10 nm under an Ar gas pressure of 10 mTorr, using an Ru target. Next, a CoCr—$SiO_2$ magnetic layer 52 is formed to a thickness of 1.0 nm, using a 94 mole % of Co17Cr to 6 mole % of $SiO_2$ target. Next, an Ru exchange coupling control layer 57 is formed to a thickness of 0.05 nm under an Ar gas pressure of 10 mTorr, using an Ru target. A CoCrPt—$SiO_2$—$Cr_2O_3$ magnetic layer 53 is formed to a thickness of 4.5 nm, using a 91 mole % of Co16Cr17Pt to 7 mole % of $SiO_2$ to 2 mole % of $Cr_2O_3$ target. Next, a CoPtCrB magnetic layer 54 is formed to a thickness of 2.5 nm, using a Co22Pt5Cr5B target.

Working Example 4

The perpendicular magnetic recording medium is fabricated with everything done in the same way as in Working Example 2, except for implementing the formation of magnetic recording layer 5 in the following way. This working example corresponds to FIG. 3.

A CoPtCr—$TiO_2$—$SiO_2$ magnetic layer 51 is formed to a thickness of 5.7 nm under an Ar gas pressure of 50 mTorr, using an 89 mole % of Co24Pt2Cr to 8 mole % of $TiO_2$ to 3 mole % of $SiO_2$ target. Next, an Ru exchange coupling control layer 56 is formed to a thickness of 0.12 nm under an Ar gas pressure of 10 mTorr, using an Ru target. Next, a CoCr—$SiO_2$ magnetic layer 52 is formed to a thickness of 1.5 nm, using a 94 mole % of Co17Cr to 6 mole % of $SiO_2$ target. Next, a CoCrPt—$SiO_2$—$Cr_2O_3$ magnetic layer 53 is formed to a thickness of 4.3 nm, using a 91 mole % of Co16Cr17Pt to 7 mole % of $SiO_2$ to 2 mole % of $Cr_2O_3$ target. Next, an Ru exchange coupling control layer 58 is formed to a thickness of 0.10 nm under an Ar gas pressure of 10 mTorr, using an Ru target. Next, a CoPtCrB magnetic layer 54 is formed to a thickness of 2.5 nm, using a Co22Pt5Cr5B target.

Working Example 5

The perpendicular magnetic recording medium is fabricated with everything done in the same way as in Working Example 2, except for implementing the formation of magnetic recording layer 5 in the following way. This working example corresponds to FIG. 4.

A CoPtCr—$TiO_2$—$SiO_2$ magnetic layer 51 is formed to a thickness of 6.2 nm under an Ar gas pressure of 50 mTorr, using an 89 mole % of Co24Pt2Cr to 8 mole % of $TiO_2$ to 3 mole % of $SiO_2$ target. Next, an Ru exchange coupling control layer 56 is formed to a thickness of 0.10 nm under an Ar gas pressure of 10 mTorr, using an Ru target. Next, a CoCr—$SiO_2$ magnetic layer 52 is formed to a thickness of 1.0 nm, using a 94 mole % of Co17Cr to 6 mole % of $SiO_2$ target. Next, an Ru exchange coupling control layer 57 is formed to a thickness of 0.05 nm under an Ar gas pressure of 10 mTorr, using an Ru target. A CoCrPt—SiO$_2$—Cr$_2$O$_3$ magnetic layer 53 is formed to a thickness of 4.7 nm, using a 91 mole % of Co16Cr17Pt to 7 mole % of SiO$_2$ to 2 mole of Cr$_2$O$_3$ target. Next, an Ru exchange coupling control layer 58 is formed to a thickness of 0.10 nm under an Ar gas pressure of 10 mTorr, using an Ru target. Next, a CoPtCrB magnetic layer 54 is formed to a thickness of 2.5 nm, using a Co22Pt5Cr5B target.

Comparison Example 5

The perpendicular magnetic recording medium is fabricated with everything done in the same way as in Working Example 2, except that no Ru exchange coupling control layer 56 is deposited.

Hereafter, a description will be given of performance evaluation results of the perpendicular media of working examples 2, 3, and 4.

Firstly, as a preliminary study, magnetic anisotropy in a single 10 nm film is measured with a torque meter for each magnetic layer used in the working examples and comparison example. The results thereof are that the 89 mole % of Co24Pt2Cr to 8 mole % of TiO$_2$ to 3 mole % of SiO$_2$ has a Ku of 8.3×10$^6$ erg/cc, the 94 mole % of Co17Cr to 6 mole % of SiO$_2$ has a Ku of 2.0×10$^6$ erg/cc, the 91 mole % of Co16Cr17Pt to 7 mole % of SiO$_2$ to 2 mole % of Cr$_2$O$_3$ has a Ku of 4.0×10$^6$ erg/cc, and the Co22Pt5Cr5B has a Ku of 8.9×10$^6$ erg/cc.

Next, a measurement of the electromagnetic conversion characteristics of Working Examples 2 to 5 and Comparison Example 5 is carried out in order to clarify the practical advantage of the invention. Evaluation conditions, and the like, are the same as those described in Working Example 1. Table 2 shows a summary of the existence or otherwise of an exchange coupling control layer, and electromagnetic conversion characteristic evaluation results.

TABLE 2

Electromagnetic Conversion Characteristic Evaluation Results

| | First Exchange Coupling Control Layer | Second Exchange Coupling Control Layer | Third Exchange Coupling Control Layer | OW (dB) | SNR (dB) | Oblique Magnetic Field Resistance |
|---|---|---|---|---|---|---|
| Working Example 2 | Yes | No | No | 36.1 | 13.4 | 0.82 |
| Working Example 3 | Yes | Yes | No | 37.2 | 13.9 | 0.82 |
| Working Example 4 | Yes | No | Yes | 36.8 | 13.5 | 0.83 |
| Working Example 5 | Yes | Yes | Yes | 37.8 | 14.2 | 0.82 |
| Comparison Example 5 | No | No | No | 19.5 | 7.2 | 0.76 |

On referring to Table 2, it is confirmed that the OW characteristics and SNR of Working Examples 2 to 5 improve markedly with respect to Comparison Example 5, and that the advantage of the exchange coupling control layer is the same as in Working Example 1. On comparing the Working Examples 2 to 5, the OW characteristics improve, and the SNR improves, when the number of exchange coupling control layers is increased. The oblique magnetic field resistance is approximately the same. From the results, it can be seen that it is possible to effectively improve writing capability by applying a plurality of exchange coupling control layers, and optimizing the thickness of each layer.

As heretofore described, it is clear that the invention has an excellent advantage.

Thus, a perpendicular magnetic recording medium has been described according to the present invention. Many modifications and variations may be made to the techniques and structures described and illustrated herein without departing from the spirit and scope of the invention. Accordingly, it should be understood that the devices and methods described herein are illustrative only and are not limiting upon the scope of the invention.

This application is based on and claims priority to Japanese Patent Application 2010-173411, filed on Aug. 2, 2010, and 2011-056576, filed Mar. 15, 2011. The disclosures of the priority applications in their entirety, including the drawings, claims, and the specification thereof, are incorporated herein by reference.

What is claimed is:

1. A perpendicular magnetic recording medium, comprising:
a non-magnetic base, and
a magnetic recording layer on the non-magnetic base, wherein the magnetic recording layer comprises a first magnetic layer, a first exchange coupling control layer, a second magnetic layer, a third magnetic layer, and a fourth magnetic layer, in that order, wherein when the perpendicular magnetic anisotropy constants of the first magnetic layer, second magnetic layer, third magnetic layer, and fourth magnetic layer are $Ku_1$, $Ku_2$, $Ku_3$, and $Ku_4$ respectively, relationships of $Ku_4 > Ku_3 > Ku_2$ and $Ku_1 > Ku_3 > Ku_2$ are satisfied.

2. The perpendicular magnetic recording medium according to claim 1, wherein a second exchange coupling control layer is provided between the second magnetic layer and third magnetic layer.

3. The perpendicular magnetic recording medium according to claim 1, wherein a second exchange coupling control layer is provided between the third magnetic layer and fourth magnetic layer.

4. The perpendicular magnetic recording medium according to claim 1, wherein a second exchange coupling control layer is provided between the second magnetic layer and third magnetic layer, and a third exchange coupling control layer is provided between the third magnetic layer and fourth magnetic layer.

* * * * *